United States Patent [19]

Castagnos, Jr. et al.

[11] Patent Number: 5,376,339
[45] Date of Patent: * Dec. 27, 1994

[54] DIRECT-COUPLED FCC RISER CYCLONE AND PLENUM

[75] Inventors: Leonce F. Castagnos, Jr., The Woodlands; Harold C. Kaufman, Houston, both of Tex.

[73] Assignee: Texaco Inc., White Plains, N.Y.

[*] Notice: The portion of the term of this patent subsequent to Sep. 28, 2010 has been disclaimed.

[21] Appl. No.: 151,647

[22] Filed: Nov. 15, 1993

[51] Int. Cl.$^5$ .................... B01J 8/18; C10G 11/18
[52] U.S. Cl. ............................ 422/142; 422/147; 422/214; 208/157; 208/161; 208/164
[58] Field of Search ............. 208/113, 146, 152, 157, 208/161, 164; 422/112, 111, 110, 113, 142, 143, 144, 147, 214

[56] References Cited

U.S. PATENT DOCUMENTS

| | | | |
|---|---|---|---|
| 4,502,947 | 3/1985 | Haddad et al. | 208/161 |
| 4,623,446 | 11/1986 | Haddad et al. | 208/113 |
| 4,737,346 | 4/1988 | Haddad et al. | 422/144 |
| 5,037,617 | 8/1991 | Soni | 422/142 |
| 5,248,411 | 9/1994 | Chan | 208/161 |

*Primary Examiner*—Anthony McFarlane
*Assistant Examiner*—Bekir L. Yildirim
*Attorney, Agent, or Firm*—James L. Bailey; Kenneth R. Priem; Richard A. Morgan

[57] ABSTRACT

A riser cyclone separator is positioned external to a containment vessel. The riser cyclone separator discharges separated catalyst to a catalyst stripper and separated vapor to a plenum, both positioned internal to the containment vessel. Means is provided for withdrawing stripping gas from the catalyst stripper and passing it via the riser cyclone separator to the plenum. The riser cyclone separator is inherently pressure stable relative to the containment vessel. The invention is particularly useful for retrofitting a direct-connected riser cyclone separator to a preexisting containment vessel with space limitations.

7 Claims, 1 Drawing Sheet

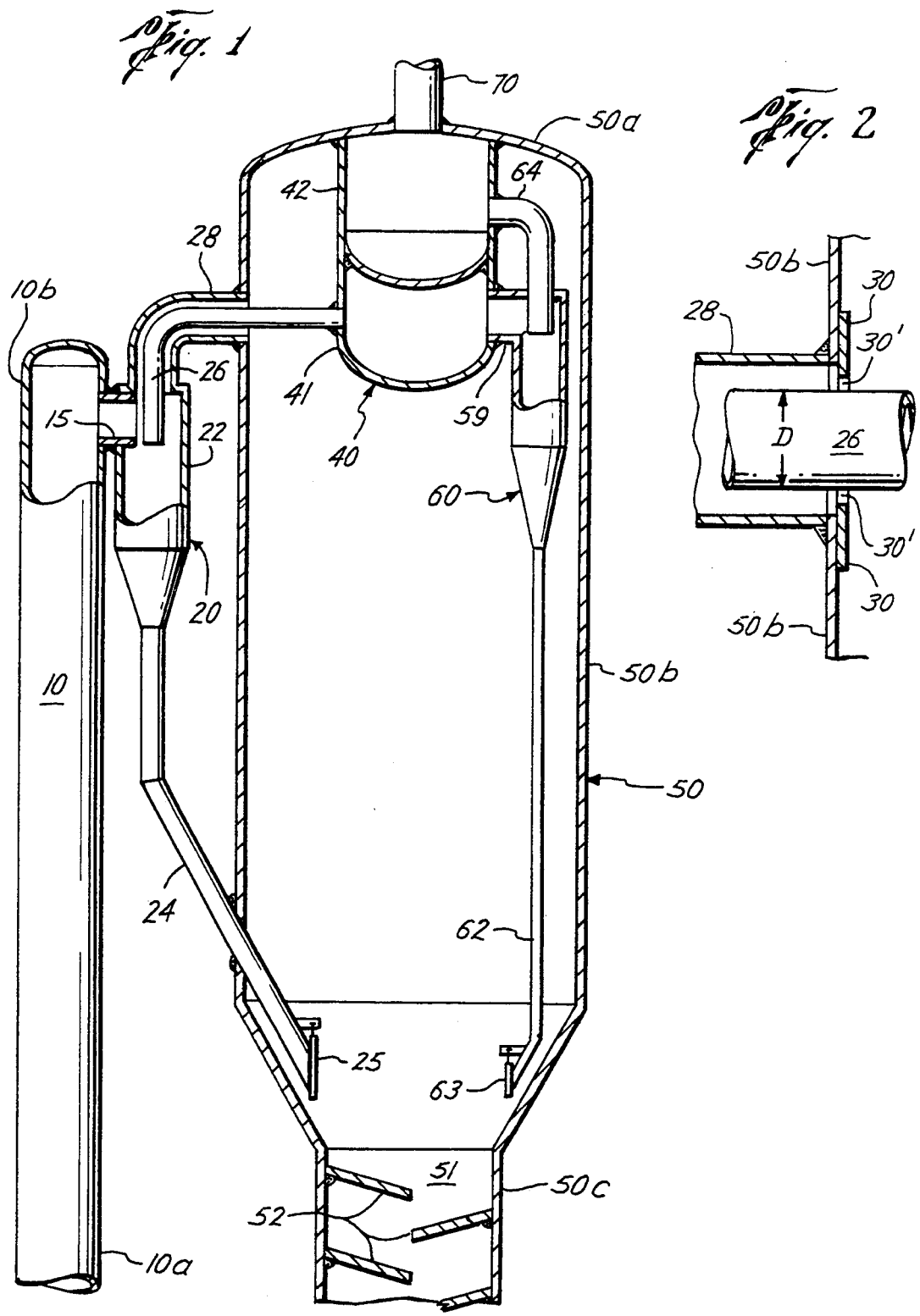

DIRECT-COUPLED FCC RISER CYCLONE AND PLENUM

BACKGROUND OF THE INVENTION

1. The Field of the Invention

The invention relates to a cyclone separator apparatus attached directly to a fluid catalytic cracking (FCC) riser reactor.

2. The Related Art

U.S. Pat. No. 5,248,411, the disclosure of which is incorporated herein by reference, describes an apparatus for rapidly separating catalyst from a cracked hydrocarbon gas in a fluidized catalytic cracking (FCC) unit. It also describes a process for withdrawing stripper gas from an FCC reactor vessel. A vent orifice for withdrawal of reactor and stripper gasses is located in an annular space formed around the riser cyclone outlet tube and the roof of the riser cyclone. The vent orifice provides pressure stability in a direct-coupled cyclone system.

The fluid catalytic cracking (FCC) process comprises mixing hot regenerated catalyst with a hydrocarbon feedstock in a transfer line riser reactor under catalytic cracking reaction conditions. The feedstock is cracked to yield gasoline boiling range hydrocarbon as well as degradation products, such as coke, which deposits on the catalyst causing a reduction in catalytic activity. Hydrocarbon vapor and coked catalyst are passed from the top of the riser reactor to a containment vessel, containing a cyclone separator, wherein catalyst is separated from hydrocarbon. In the art, the separator vessel is termed the reactor vessel or the disengager vessel. The separated catalyst is passed to a stripper, also in the containment vessel, and contacted with a stripping gas to remove volatile hydrocarbon. Stripped catalyst is then passed to a separate regeneration vessel wherein coke is removed from the catalyst by oxidation at a controlled rate. Catalyst, substantially freed of coke, is collected in a vertically oriented regenerated catalyst standpipe. The regenerated catalyst is passed from the standpipe to the riser reactor for cyclic reuse in the process.

A conventional fluid catalytic cracking (FCC) feedstock comprises any of the hydrocarbon fractions known to yield a liquid fuel boiling range fraction. These feedstocks include light and heavy gas oils, diesel, atmospheric residuum, vacuum residuum, naphtha such as low grade naphtha, coker gasoline, visbreaker gasoline and like fractions from steam cracking.

Catalyst development has improved the fluid catalytic cracking (FCC) process. High activity, selectivity and feedstock sensitivity are demonstrated by the new crystalline zeolite cracking catalysts. These high activity catalysts have been used to improve the yield of more desirable products.

The hydrocarbon conversion catalyst employed in a fluid catalytic cracking (FCC) process is preferably a high activity crystalline zeolite catalyst of a fluidizable particle size. The catalyst is transferred in suspension or dispersion with a hydrocarbon feedstock, upwardly through one or more riser conversion zones which provide a hydrocarbon residence time in each conversion zone in the range of 0.5 to about 10 seconds, typically less than about 8 seconds. High temperature riser hydrocarbon conversions, occurring at temperatures of at least 900° F. (482° C.) up to about 1450° F. (788° C.), pressures of 5 psig (1.3 atm) to 45 psig (4 atm) and at 0.5 to 4 seconds hydrocarbon catalyst residence time in the riser, are desirable. The vaporous hydrocarbon conversion product is rapidly separated from the catalyst.

In modern fluid catalytic cracking (FCC) units, cracking temperature has been increased to obtain high conversion of feedstock boiling range material to light products. Typical cracking temperatures in modern FCC units are in the range of 980° F. (526° C.) to 1050° F. (565° C.), or above. At these high temperatures, thermal degradation of cracked liquid products can be significant, resulting in formation of additional gaseous products and loss of valuable liquid products. In many cases the FCC unit capacity and operating severity are limited by the ability to compress and recover the light gaseous products.

Rapid separation of catalyst from hydrocarbon product is particularly desirable to limit hydrocarbon conversion time to the residence time in the riser conversion zone. During the hydrocarbon conversion, coke accumulates on the catalyst particles and entrains hydrocarbon vapors. Entrained hydrocarbon contact with the catalyst continues after removal from the hydrocarbon conversion zone until the hydrocarbon is separated from the catalyst. Allowing the catalytic reaction to proceed beyond the optimum contact time results in degradation of liquid products to less desirable gaseous products and coke.

catalyst is separated from hydrocarbon by cyclone separators and then stripped with a stripping gas to remove volatilizable hydrocarbon. Hydrocarbon conversion products and stripped hydrocarbon are combined and passed to a fractionation and vapor recovery system. This system comprises a fractionation tower, vapor coolers and wet gas compressor operated at a suction pressure of 0.5 psig (1.03 atm) to 10 psig (1.7 atm). Stripped catalyst containing deactivating amounts of coke, is passed to a catalyst regeneration zone.

One or more cyclone separators are used to provide a rapid, efficient separation of cracked hydrocarbon from catalyst particles at the outlet of the riser reactor. These cyclone separators, usually designated as riser our rough-cut cyclones, terminate the catalytic reactions taking place in the riser reactor. Riser cyclones may be either external, or more commonly, internal to the reactor or disengager vessel. The separated vapor from riser cyclones is typically discharged into the upper section of the reactor vessel and passed to one or more sets of secondary cyclones for removal of catalyst particles before the vapors enter the fractionation and vapor recovery system. In FCC units operating at cracking temperatures above about 980° F. (526° C.), significant thermal degradation of cracked products can occur when the vapors are allowed to enter the reactor or disengager vessel. To reduce thermal degradation of cracked products, direct-coupled or closed cyclone systems, such as disclosed in U.S. Pat. No. 5,248,411 have been used. In direct-coupled cyclones, the separated vapors from the riser cyclones are passed directly to the inlet of secondary cyclones. Direct-coupled cyclones reduce thermal degradation of cracked products by shortening the residence time of the vapor.

An object of the present invention is to provide an apparatus for rapidly separating the catalyst-hydrocarbon suspension. Another object is to establish a stable pressure gradient between the cyclone barrel and the reactor vessel to facilitate removing stripper gas from the reactor vessel. And yet another object of this invention is to provide a direct-coupled cyclone system for use with riser cyclones external to the reactor or disengager vessel.

U.S. Pat. Nos. 4,623,446 and 4,737,346 to J. H. Haddad et al. teach a closed-coupled cyclone separator system in the reactor vessel of a fluid catalytic cracking apparatus. Means is provided for blending stripping gas with cracked hydrocarbon as it flows to a directly coupled riser cyclone separator.

U.S. Pat. No. 4,502,947 to Haddad et al. discloses a closed cyclone fluid catalytic cracking catalyst separation method and apparatus. In the closed cyclone, hydrocarbon product and catalyst are passed directly into a cyclone separator from a riser without passing into the atmosphere of the reactor vessel. Avoiding the atmosphere of the reactor vessel reduces both excess catalytic cracking and high temperature thermal cracking.

U.S. Pat. No. 5,221,301 to N. L. Giuricich discloses a multistage cyclone separator system with a plenum providing a manifold and structural support.

There is a need in the art to capture the process advantages of U.S. Pat. No. 5,248,411 in existing fluid catalytic cracking (FCC) reactor vessels where limited free volume restricts retrofit of a direct-coupled riser cyclone.

SUMMARY OF THE INVENTION

The invention is an apparatus for the fluid catalytic cracking (FCC) of a hydrocarbon feedstock in a riser reactor attached to a direct-coupled cyclone system. An essential feature of the system is a closed cyclone external to a reactor vessel.

The apparatus comprises a vertically elongated reactor vessel comprising an upper end, a lower end and a side wall. In the upper end is a plenum for the withdrawal of gases. In the lower end is a catalyst stripper providing for counter-current contacting of catalyst with stripping gas and for catalyst withdrawal.

A vertically elongated riser reactor comprises an upstream, inlet end and a downstream, outlet end. The outlet end is directly attached to a riser cyclone. The riser cyclone comprises: (i) a vertically elongated barrel external to the reactor vessel, (ii) an elongated dipleg traversing the reactor vessel sidewall and in flow communication with the catalyst stripper, (iii) a vapor outlet conduit traversing the reactor vessel sidewall and attached to the plenum, and (iv) a stripper gas conduit traversing the reactor vessel sidewall, providing fluid communication between the catalyst stripper and the cylindrical barrel.

BRIEF DESCRIPTION OF THE DRAWINGS

FIG. 1 is a vertical section through a portion of a direct-coupled cyclone system incorporation the invention.

FIG. 2 is a detailed view of a portion of FIG. 1.

DETAILED DESCRIPTION OF THE INVENTION

The invention will now be described, by way of example with reference to FIG. 1 and FIG. 2 which are representative of an apparatus for contacting a hydrocarbon feedstock with finely divided fluidized catalyst in riser reactor 10. Riser reactor 10 comprises an upstream, inlet end 10a and a downstream, outlet end 10b. A mixture of cracked hydrocarbon vapors and finely divided catalyst are discharged from riser reactor 10 via direct-coupling conduit 15 into riser cyclone separator 20.

Riser cyclone separator 20 is closed-coupled (direct-coupled) with riser reactor 10. Direct coupling conduit 15 joins the two and is constructed as shown to enclose and completely separate the cracked hydrocarbon vapor and finely divided catalyst flowing therethrough from the surrounding atmosphere.

Reactor vessel or reactor is a term used in the fluid catalytic cracking (FCC) art referring generally to the containment vessel which receives the reaction mixture discharge from a fluid catalytic cracking (FCC) riser reactor. It is essential to the invention that riser cyclone separator 20 is external to reactor vessel 50. Inventors contemplate that this configuration would be used to retrofit a closed-coupled riser cyclone to a riser reactor in which a preexisting reactor vessel were limited in free volume. Such a retrofit is the Best Mode contemplated by Inventors for application of the invention.

Reactor vessel 50 comprises an upper end 50a, a sidewall 50b and a lower end 50c. Within upper end 50a is a plenum 40 for the withdrawal of hydrocarbon vapors via conduit 70. Within the lower end 50c, a catalyst stripper 51 occupies the internal volume of lower end 50c including a series of baffles 52 facilitating the countercurrent contacting of stripping gas and catalyst.

Riser cyclone 20 comprises barrel 22, dipleg 24, vapor outlet conduit 26 and stripper gas conduit 28. Barrel 22 provides for the separation of cracked hydrocarbon vapors from finely divided catalyst delivered via transitional conduit 15. Dipleg 24 traverses side wall 50b, conducting catalyst from barrel 22 to catalyst stripper 51. Separated catalyst falls by gravitational force from barrel 22 down dipleg 24. Flow is resisted by sealing means 25 which is optionally attached to the lower end of dipleg 24. Sealing means 25 is typically a J-valve, trickle valve or as shown in the drawing a flapper valve. Sealing means 25 seals dipleg 24 from the flow of stripping gas up the dipleg 24, while allowing for the flow of catalyst to catalyst stripper 51 with only superficial resistance to flow in order to retain some amount of catalyst in the dipleg.

Cracked vapor is withdrawn from barrel 22 via vapor outlet conduit 26 traversing reactor vessel side wall 50b, and discharges into lower plenum 41. Stripper gas conduit 28 and reactor vessel 50 provide for the transport of stripper gas from stripper 51 to barrel 22. This stripper gas is withdrawn from barrel 22 along with cracked vapor via vapor outlet conduit 26.

The orientation of vapor outlet conduit 26 and stripper gas conduit 28 are shown in more detail in FIG. 2. The stripper gas conduit 28 traverses and is attached to reactor vessel side wall 50b. Vapor outlet conduit 26 is concentric with the gas discharge conduit 28. Vapor outlet conduit 26 traverses but is not attached to reactor vessel side wall 50b because it is internal to stripper gas conduit 28. In particular, there is flow area between vapor outlet conduit 26 and gas discharge conduit 28.

The relative proportion of cyclone separator members is known in the art. *Perry's Chemical Engineers' Handbook*, 4th ed., pp. 20–68 to 20–71 describes design parameters for cyclone separators used for removing solid particles from vapors. *Kirk-Othmer Encyclopedia of Chemical Technology*, 3rd ed., Vol. 1, pp. 667 to 672 describes general design parameters for cyclone separators used for separating solid particles from gases.

In the art, the proportion of cyclone separator members is specified relative to the vapor outlet conduit size required to remove the volume of vapor. In FIG. 2, vapor outlet conduit 26 is shown with a diameter D. In industrial practice this diameter is typically in the range of 12 inch (30.5 cm) to 60 inch (152.4 cm). A flow area of 0.08 $D^2$ is provided between the outer diameter of vapor outlet conduit 26 and the inner diameter of stripper gas inlet conduit 28.

The pressure in a fluid catalytic cracking reactor vessel ranges between 0.5 psig (1.03 atm) and 45 psig (4 atm), with 25 psig (2.7 atm) being typical in current practice. The pressure in an open riser cyclone, i.e., one that discharges separated vapors directly into the reactor vessel, is greater than that of the reactor vessel. In contrast, it has been found advantageous to maintain the pressure in the riser cyclone of a direct-connected cyclone system lower than that of the reactor vessel. The optimum pressure inside the riser cyclone of a direct-connected cyclone system is typically 0.1 to 2 psi (0.007 to 0.14 arm) below that of the reactor vessel. The pressure gradient is caused by the lower pressure of the vapor recovery system (not shown) in flow communication with outlet conduit 70. This 0.1 to 2 psi (0.007 to 0.14 atm) pressure differential is the motive force which draws stripper gas into the riser (first) cyclone. Typically, stripping gas flows through two stages of cyclone separation, shown in FIG. 1, as it is removed from the reactor vessel.

The 0.1 to 2 psi (0.007 to 0.14 atm) differential is maintained by correctly sizing the flow area between gas discharge conduit 26 and stripper gas outlet conduit 28.

Applicants have found that providing a flow area of 0.02 $D^2$ to 0.09 $D^2$ between gas discharge conduit 26 and stripper gas inlet conduit 28 provides for the required stripper gas flow. This may be accomplished in the selection of conduit sizes. In the alternative, restriction orifice plate 30 is attached to reactor vessel side wall 50b to provide a flow area of 0.02 $D^2$ to 0.09 $D^2$ through annular gap 30'.

As previously mentioned, the invention is particularly adopted to retrofitting a direct-connected riser cyclone to a preexisting reactor vessel. Secondary cyclone separator 60 is shown in FIG. 1 as a single cyclone separator. Secondary cyclone separator 60 is representative of an array of cyclone separators, typically 2, 4, 6 or 8 in number which occupies reactor vessel 50. Such an array is shown by way of example in U.S. Pat. No. 5,221,301 to N. L. Giuricich incorporated herein by reference in its entirety. It is contemplated that the array of cyclone separators be arranged either in parallel or in series. That is, each cyclone is secondary to riser cyclone separator 20. In the alternative, some cyclones are secondary to riser cyclone separator 20 and some are tertiary. For example, in an array of 8 cyclone separators contained by reactor vessel 50, 4 cyclone separators are secondary to riser cyclone separator 20 and 4 cyclone separators are tertiary.

Secondary cyclone separator 60 draws hydrocarbon vapor and catalyst fines from primary plenum 41 via conduit 59. Catalyst fines are discharged via dipleg 62 and sealing means 63 to catalyst stripper 51. Sealing means 63 is similar to sealing means 25. Separated vapor is passed via conduit 64 to secondary plenum 42. From secondary plenum 42 vapor is passed via conduit 70 to vapor recovery system (not shown).

While particular embodiments of the invention have been described, it will be understood, of course, that the invention is not limited thereto since modifications may be made, and it is, therefore, contemplated to cover by the appended claims any such modifications as fall within the time spirit and scope of the invention.

What is claimed is:

1. An apparatus for the fluid catalytic cracking of a hydrocarbon feedstock in a closed cyclone system, said apparatus comprising:
   a. a vertically elongated reactor vessel comprising: a reactor vessel upper end, a reactor vessel lower end and a reactor vessel sidewall, said reactor vessel upper end comprising a plenum for withdrawal of gases, said reactor vessel lower end comprising a catalyst stripper and means for withdrawing catalyst;
   b. a vertically elongated riser reactor having an outlet end, directly attached to a closed cyclone, said closed cyclone comprising:
      (i) a vertically elongated cylinder barrel external to the reactor vessel,
      (ii) an elongated dipleg traversing the reactor vessel sidewall and in flow communication with the catalyst stripper,
      (iii) a vapor outlet conduit traversing the reactor vessel sidewall and attached to the plenum, and
      (iv) a stripper gas conduit traversing the reactor vessel sidewall, providing fluid communication between the catalyst stripper and the cylindrical barrel.

2. An apparatus for the fluid catalytic cracking of a hydrocarbon feedstock in a closed cyclone system, said apparatus comprising:
   a. a vertically elongated reactor vessel comprising: a reactor vessel upper end, a reactor vessel lower end and a reactor vessel sidewall, said reactor vessel upper end comprising a plenum for the withdrawal of gases, said reactor vessel lower end comprising a catalyst stripper and means for withdrawing catalyst;
   b. a vertically elongated riser reactor having an inlet end and an outlet end, said outlet end directly attached to a closed cyclone, said closed cyclone external to the reactor vessel,
   c. said closed cyclone comprising:
      (i) a vertically elongated cylindrical comprising an upper barrel end and a lower barrel end,
      (ii) a dipleg comprising an elongated tubular conduit traversing the reactor vessel sidewall, an upper dipleg end attached to the lower barrel end and a lower dipleg end in direct fluid communication with the catalyst stripper,
      (iii) a barrel top cover attached to the upper barrel end,
      (iv) a vertically oriented gas discharge conduit axially aligned with said cylindrical barrel and traversing the barrel top cover, having an inlet end in fluid communication with the cylindrical barrel and an outlet end attached to said plenum, providing fluid communication therebetween,
      (v) a stripper gas inlet conduit traversing the reactor vessel sidewall, attached at an outlet end to the barrel top cover and providing fluid communication by means of an inlet end between the reactor vessel and the cylindrical barrel.

3. The apparatus of claim 2 wherein a sealing means is attached to the lower dipleg end.

4. The apparatus of claim 2 wherein a flapper valve is attached to the lower dipleg end.

5. The apparatus of claim 2 wherein the stripper gas inlet conduit is concentric with the gas discharge conduit.

6. The apparatus of claim 2 wherein the gas discharge conduit is cylindrical having a diameter D and the stripper gas inlet conduit is concentric with an external to the gas discharge conduit providing a flow area therebetween of $0.02 D^2$ to $0.09 D^2$.

7. The apparatus of claim 2 wherein the gas discharge conduit is cylindrical having a diameter D and the stripper gas inlet conduit is concentric with and external to the gas discharge conduit and a restriction orifice provides a flow area therebetween of $0.02 D^2$ to $0.09 D^2$.

* * * * *